United States Patent
Wu (10) Patent No.: US 11,983,250 B2
(45) Date of Patent: May 14, 2024

(54) ITEM-CUSTOMER MATCHING METHOD AND DEVICE BASED ON VISION AND GRAVITY SENSING

(71) Applicant: Yi Tunnel (Beijing) Technology Co., Ltd., Beijing (CN)

(72) Inventor: Yili Wu, Beijing (CN)

(73) Assignee: Yi Tunnel (Beijing) Technology Co., Ltd., Beijing (CN)

(*) Notice: Subject to any disclaimer, the term of this patent is extended or adjusted under 35 U.S.C. 154(b) by 924 days.

(21) Appl. No.: 16/965,563

(22) PCT Filed: Apr. 14, 2020

(86) PCT No.: PCT/CN2020/084780
§ 371 (c)(1),
(2) Date: Jul. 28, 2020

(87) PCT Pub. No.: WO2021/042730
PCT Pub. Date: Mar. 11, 2021

(65) Prior Publication Data
US 2023/0160740 A1 May 25, 2023

(30) Foreign Application Priority Data

Sep. 6, 2019 (CN) .......................... 201910840293.7
Apr. 2, 2020 (CN) .......................... 202010256683.2

(51) Int. Cl.
*G01G 19/414* (2006.01)
*G06F 18/25* (2023.01)
(Continued)

(52) U.S. Cl.
CPC ........... *G06F 18/25* (2023.01); *G01G 19/414* (2013.01); *G06Q 10/087* (2013.01); *G06T 7/194* (2017.01);
(Continued)

(58) Field of Classification Search
CPC ........ G06F 18/25; G06V 20/52; G06V 40/20; G06V 20/20; G06V 20/68; G06V 20/64;
(Continued)

(56) References Cited

U.S. PATENT DOCUMENTS 10,318,917 B1* 6/2019 Goldstein ............ G06Q 20/203
10,586,208 B2* 3/2020 Buibas ..................... G01S 17/08
(Continued)

FOREIGN PATENT DOCUMENTS

CN    107833365 A    3/2018
CN    107886655 A    4/2018
(Continued)

OTHER PUBLICATIONS

SIPO, International Search Report issued in IA Application No. PCT/CN2020/084780, dated Jul. 20, 2020.

*Primary Examiner* — Jeffrey P Aiello
(74) *Attorney, Agent, or Firm* — LKGlobal | Lorenz & Kopf LLP (57) ABSTRACT

The present invention discloses an item-customer matching method and device based on vision and gravity sensing, and belongs to the technical field of computer. The method comprises acquiring the identity information of a customer and tracking the customer in real time in the shopping place, wherein shelves for carrying items are arranged; acquiring the shelf position of the shelf where the loading weight changes; identifying the items that cause changes in the loading weight of the shelf to obtain the item identification result; determining the identity information of the purchaser according to the shelf position, the hand position of the customer, and the action behavior of the customer, wherein the purchaser is a customer matching the item identification result. The device includes a customer tracking module, a shelf position acquiring module, an item identification result acquiring module, and a matching module. The present (Continued)

invention realizes the accurate matching between the item identification result and the customer by the above-mentioned technical solution, which is beneficial to the completion of the settlement work of the unmanned convenience store, and can also improve the accuracy of the item identification.

2 Claims, 4 Drawing Sheets (51) Int. Cl.
*G06Q 10/087* (2023.01)
*G06T 7/194* (2017.01)
*G06V 20/52* (2022.01)
*G06V 40/20* (2022.01)

(52) U.S. Cl.
CPC .............. *G06V 20/52* (2022.01); *G06V 40/20* (2022.01); *G06T 2207/30232* (2013.01)

(58) Field of Classification Search
CPC .............. G06V 40/172; G01G 19/414; G01G 19/4144; G01G 19/00; G01G 19/42; G01G 19/40; G01G 19/52; G06Q 10/087; G06Q 20/208; G06Q 30/0601; G06Q 20/20; G06Q 20/203; G06Q 30/0639; G06T 2207/30232; G06T 7/194; G06T 7/70; G06T 7/20; G06T 2207/30196; G06T 2207/30242; G06T 2207/10016; G06T 7/13; G06T 2207/30244; G06K 7/10722
USPC .............. 235/383, 385; 340/5.83, 5.91–5.92, 340/568.1–568.5; 382/100, 103, 382/115–118, 181, 305; 702/22, 702/149–152, 173; 705/26.1, 26.8, 26.61, 705/28

See application file for complete search history.

(56) References Cited

U.S. PATENT DOCUMENTS

| | | | |
|---|---|---|---|
| 2003/0182076 A1* | 9/2003 | Udomkesmalee | G01S 17/08 702/150 |
| 2009/0063176 A1* | 3/2009 | French | G06Q 10/087 705/21 |
| 2021/0056498 A1* | 2/2021 | Liu | G01G 19/4144 |
| 2022/0230216 A1* | 7/2022 | Buibas | G06V 10/454 |

FOREIGN PATENT DOCUMENTS

| | | |
|---|---|---|
| CN | 108198052 A | 6/2018 |
| CN | 108549851 A | 9/2018 |
| CN | 208188867 U | 12/2018 |
| CN | 109409291 A | 3/2019 |
| CN | 109649915 A | 4/2019 |
| CN | 109886169 A | 6/2019 |

* cited by examiner

ITEM-CUSTOMER MATCHING METHOD AND DEVICE BASED ON VISION AND GRAVITY SENSING

RELATED APPLICATIONS

This application is the National Stage application under 35 U.S.C. 371 of PCT International Application No. PCT/CN2020/084780, filed on Apr. 14, 2020, which claims priority from Chinese Patent Application No. CN202010256683.2, filed on Apr. 2, 2020, and Chinese Patent Application No. CN201910840293.7, filed on Sep. 6, 2019, the contents of which are hereby incorporated by reference in their entirety.

FIELD OF INVENTION

The present invention belongs to the technical field of computer, and specifically relates to an item-customer matching method and device based on vision and gravity sensing.

BACKGROUND OF THE INVENTION

When customers see the items they like or need in supermarkets, stores and other shopping places, they need to settle accounts to obtain the items.

In the prior art, customers are usually matched with items by queuing at the checkout counter and scanning the barcode on the items through a barcode scanning terminal held by the cashier, so as to determine the items that the customers intend to purchase for settlement.

As the matching process between customers and items requires the cashier to participate, and the cashier's working time is limited that they cannot work all day, which is not conducive to meeting the shopping needs of different customers and the customer's shopping experience is poor.

SUMMARY

In order to solve the problems in the prior art, in one aspect, the present invention provides an item-customer matching method based on vision and gravity sensing, which comprises acquiring identity information of a customer and tracking the customer in real time in the shopping place, wherein shelves for carrying items are arranged; acquiring a shelf position of the shelf where a loading weight changes; identifying the items that cause changes in the loading weight of the shelf to obtain an item identification result; determining the identity information of the purchaser according to the shelf position, a hand position of the customer, and an action behavior of the customer wherein the purchaser is a customer matching the item identification result.

In another aspect, the present invention provides an item-customer matching device based on vision and gravity sensing, which comprises: a customer tracking module for acquiring identity information of a customer and tracking the customer in real time in the shopping place, wherein shelves for carrying items are arranged; a shelf position acquiring module for acquiring a shelf position of the shelf where a loading weight changes; an item identification result acquiring module for identifying the items that cause changes in the loading weight of the shelf to obtain an item identification result; a matching module for determining the identity information of the purchaser according to the shelf position, the hand position of the customer, and the action behavior of the customer, wherein the purchaser is a customer matching the item identification result.

Yet in another aspect, the present invention provides an item-customer matching device based on vision and gravity sensing, which comprises a memory and a processor. The processor is connected with the memory, and is configured to execute the above-mentioned item-customer matching method based on vision and gravity sensing based on the instructions stored in the memory.

Still in another aspect, the present invention provides a computer-readable storage medium having stored thereon a computer program which, when executed by a processor, implements the above-mentioned item-customer matching method based on vision and gravity sensing.

The examples of the present invention have the following beneficial effects through the above-mentioned technical solution.

A shelf position of the shelf where a loading weight changes is acquired by tracking customers in real time in a shopping place; the items that cause changes in the loading weight of the shelf are identified to obtain an item identification result; the identity information of the purchaser is determined according to the shelf position, the hand position of the customer, and the action behavior of the customer, wherein the purchaser is a customer matching the item identification result, so as to realize the accurate matching between the item identification result and the customer, which is beneficial to the completion of the settlement work of the unmanned convenience store.

DETAILED DESCRIPTION OF THE EMBODIMENTS

In order to make objects, technical solutions and advantages of the present invention more apparent, the embodiments of the present invention will be further described in detail below in connection with the drawings.

Figure 1:
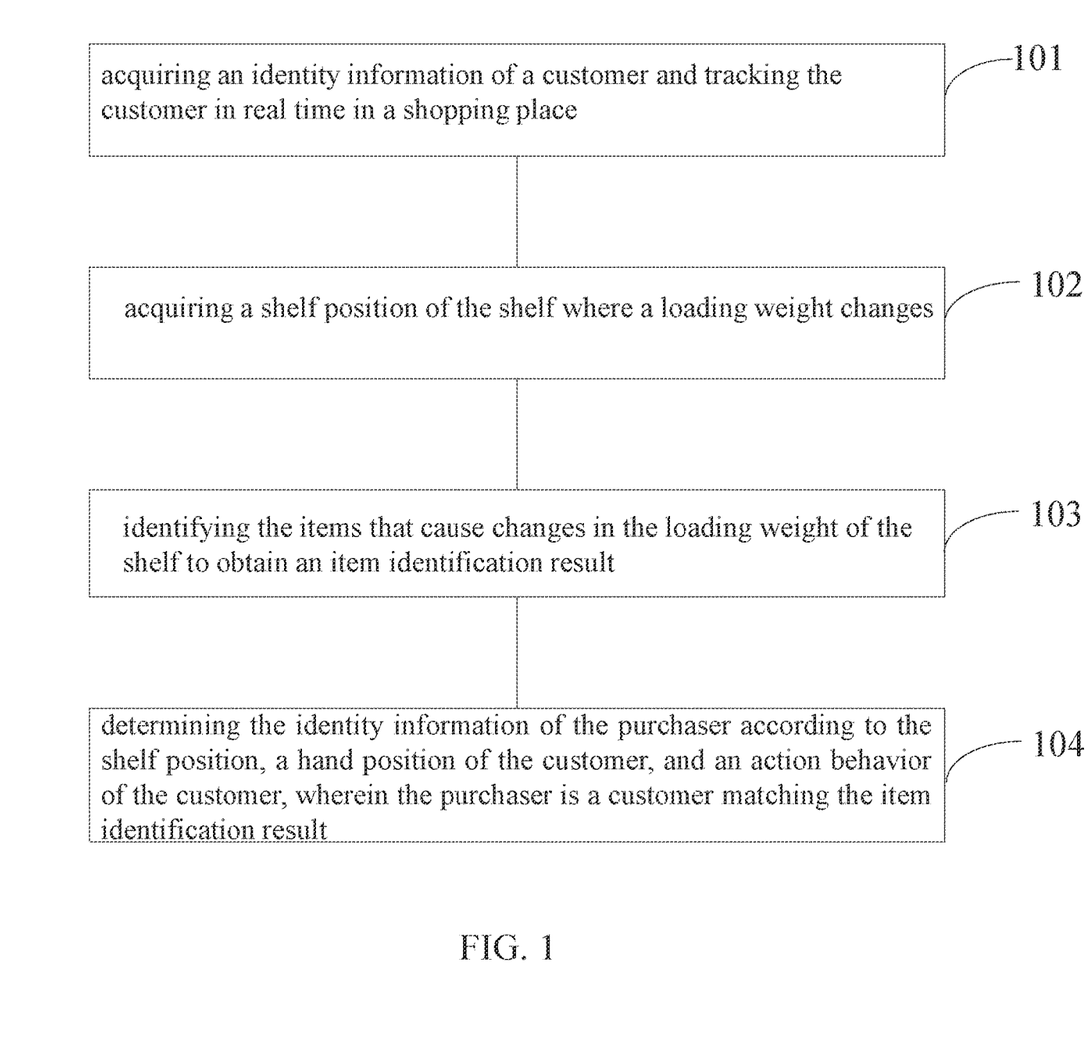
FIG. 1 is a schematic flowchart of an item-customer matching method based on vision and gravity sensing provided in an example of the present invention.

With reference to FIG. 1, an example of present invention provides an item-customer matching method based on vision and gravity sensing, which comprises the following steps:

Step 101, acquiring identity information of a customer and tracking the customer in real time in a shopping place.

Specifically, before the customer enters a shopping place, such as a store, a supermarket, and especially an unmanned store, the customer registration can be completed by installing an App (Application) corresponding to the matching method or containing the matching method on the terminal device, such as a mobile phone or a tablet computer, or through an applet or WeChat public account. The applet can be an applet in WeChat (or called WeChat applet). The registration can also be completed through a self-service registration terminal arranged in the shopping place. The identity information (ID) of the customer needs to be collected during registration, which is used to distinguish different customers and is the unique identifier of the customer, and can include one or more of ID card number, mobile phone number, user account, nickname, facial information, fingerprint information, etc. In order to facilitate customers to pay automatically without showing a payment account during settlement, the identity information may also include a payment account which can be a bank account or a third-party payment account, such as Alipay, WeChat Pay, QQ Wallet, JD Wallet. In order to better provide customers with the required items, the identity information may also include name, gender, occupation, etc.

A gate is arranged at the entrance of the shopping place. Identity information identification device acquires the identity information of customer, and thereafter verifies the identity information. The verified customer can open the gate and enter the shopping place to go shopping, while the customers who have not registered or fails verification cannot open the gate so as not to enter the shopping place. The identity information identification device may be a face identification device, and the corresponding identity information is facial information. The identity information identification device may be a fingerprint identification device, and the corresponding identity information is fingerprint information. In other examples, the identity information identification device may also be other device, such as a code scanning terminal, and the medium carrying the identity information of the customer may be a two-dimensional code. The code scanning terminal scans the two-dimensional code displayed on the terminal device held by the customer to verify the identity information of the customer. The identity information identification device can also be a two-dimensional code or barcode that characterizes the number of the shopping place. The customer scans the two-dimensional code or barcode through the App on the terminal device to implement verification of the identity information. Shelves are arranged in the shopping place, and items are placed on the shelves. Multiple shelves can be stacked at intervals to form a item shelf. The quantity of item shelves can be multiple, and multiple items shelves are arranged in the space formed by the shopping place. When the customer enters the shopping place, he can stay in front of the shelf accord to his need, and select the items he intends to purchase through executing the pick-up and put-back behaviors. The pick-up and put-back behavior includes: the pick-up behavior and the put-back behavior. The pick-up behavior indicates that there is a purchase intention, and the item is performed with the pick-up actions; the put-back behavior indicates that a purchase intention is abandoned, and the item is performed with the put-back actions. The shopping place has a large space and can accommodate multiple customers shopping at the same time. In order to determine which customer bought the item, it is necessary to maintain real-time tracking of the customer after the customer enters the shopping place, that is, to acquire the location of the customer in the shopping place in real time.

The implementation method of real-time tracking can be based on the positioning method of the depth pickup camera, such as multiple depth pickup cameras disposed on the top or ceiling of the shopping place. The shooting direction of the depth pickup camera is downward, and the quantity of depth pickup cameras can be adjusted accorded to the size of the shopping place, in practice, it is appropriate to cover the space formed by the shopping place with the shooting range. When the customer moves in the shopping place, each depth pickup camera will detect the customer's position in the image in each image frame by the target detection algorithm, and then calculate the customer's position in the three-dimensional space formed by the shopping place according to the depth information. At adjacent time points, by calculating the distance between the customer's positions, the customers with the smallest position change can be found to complete the tracking of customers. That is, by comparing the distance between customers in the three-dimensional space mentioned above in the adjacent image frames, the customer with the closest distance between the two frames is considered to be the same customer. Depth information refers to a distance between an object in three-dimensional space corresponding to each pixel point captured by a camera with a depth pickup camera and the camera itself. When the depth pickup camera is disposed above the shelf, the hand position of the customer can be acquired based on the depth pickup camera technology. Since the implementation process involves image processing, it can be called a vision-based technology.

Step 102, acquiring a shelf position of the shelf where a loading weight changes.

After entering the shopping place, the customer will move in the shopping place. When the customer encounters the items they like, they will stay in front of the shelf carrying the items, and then perform the pick-up action on the item to indicate that the item belongs to the item to be purchased, or perform the put-back action on the item to indicate that the item does not belong to the item to be purchased. When the customer performs the pick-up action, the weight carried on the shelf will decrease; when the customer performs the put-back action, the weight carried on the shelf will increase. The change of the loading weight of the shelf is detected based on the gravity sensing technology, such as setting a gravity sensor on the shelf. If the loading weight is detected to be reduced, it indicates that the customer has picked up the item; if the loading weight is detected to be increased, it indicates that the customer has put the item back. Before using, the position of each shelf in the three-dimensional space of the shopping place is measured, and corresponds to the gravity sensor disposed on it, so that when the gravity sensor detects a change in the loading weight, the shelf position of the shelf where the loading weight changes can be determined.

Step 103, identifying the items that cause changes in the loading weight of the shelf to obtain an item identification result.

Specifically, acquiring a weight change value of the change in the loading weight of the shelf based on the gravity sensing technology, acquiring a weight identification result according to the weight change value and the gravity value of each item carried by the shelf, wherein the weight identification result is the item identification result.

For example, gravity sensors are disposed for each shelf on which only items with different weight are placed. The column of shelf is provided with only one item, and the weights of items placed among columns are different. The kinds and corresponding weight values of all items on the shelf are recorded in the shelf gravity value table of the shelf. Multiple columns can be formed by setting separators at intervals on the support plate of the shelf. When the customer executes the pick-up and put back actions, the gravity sensor will detect the weight change value of shelf where the loading weight changes. When the weight change value is reduced, it indicates that the customer executes the pick-up behavior on the item; when the weight change value is increased, it indicates that the customer executes the put-back behavior on the item. The gravity value corresponding to the absolute value of the weight change value is looked up in the shelf gravity value table. If it can be found, the kind of items and the quantity of items corresponding to the gravity value are used as the weight identification result, and then the weight identification result is used as the item identification result.

Step 104, determining the identity information of the purchaser according to the shelf position, a hand position of the customer, and an action behavior of the customer, wherein the purchaser is a customer matching the item identification result.

Specifically, a customer near the shelf is determined according to the shelf position and a location of customer positioning. The customer near the shelf is a customer located around the shelf, when the loading weight changes. Then according to the action behaviors of customer near the shelf and the hand positions of the customer near the shelf, it is determined which customer in the customers near the shelf has the action behavior that causes the loading weight change of the shelf, thus the customer is the purchaser. In this way, the matching between the item identification result and the customer is completed, and the customer's identity information is determined. Then, according to the item identification result, the customer's shopping cart (shopping list or virtual shopping cart) is performed adding item operation or deleting item operation to facilitate the settlement.

In summary, in the examples of the present invention, the shelf position of the shelf where the loading weight changes is acquired by tracking the customers in real time in the shopping place; the items that cause changes in the loading weight of the shelf are identified to obtain the item identification result; the identity information of the purchaser is determined according to the shelf position, the hand position of the customer and the action behavior of the customer, wherein the purchaser is the customer matching the item identification result, thereby the accurate matching between the item identification result and the customer is realized, which is beneficial to the completion of the settlement work of the unmanned convenience store, and reduces the work of the cashier.

Figure 2:
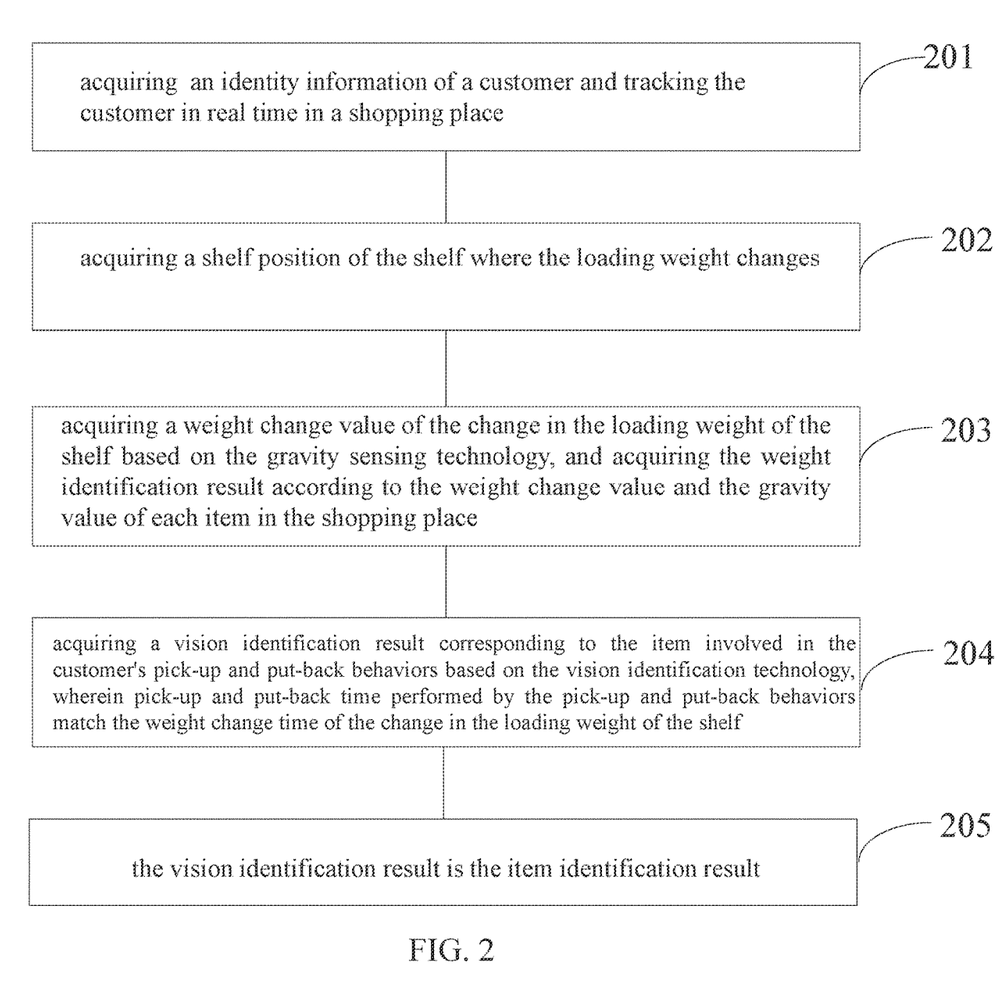
FIG. 2 is a schematic flowchart of an item-customer matching method based on vision and gravity sensing provided in another example of the present invention.

With reference to FIG. 2, another example of the present invention provides an item-customer matching method based on vision and gravity sensing, which includes the following steps.

Step 201, acquiring identity information of a customer and tracking the customer in real time in a shopping place.

Step 202, acquiring a shelf position of the shelf where a loading weight changes.

Step 203, acquiring a weight change value of the change in the loading weight of the shelf based on the gravity sensing technology, and acquiring the weight identification result according to the weight change value and the gravity value of each item in the shopping place.

Usually, the kind of each item in the shopping place, the corresponding gravity value and the initial placing shelf are recorded in the total gravity value table. It should be noted that the descriptions of steps 201-203 refer to the related descriptions of the above examples, and are not repeated herein.

Step 204, acquiring a vision identification result corresponding to the item involved in the customer's pick-up and put-back behaviors based on the vision identification technology, wherein pick-up and put-back time performed by the pick-up and put-back behavior matches the weight change time of the change in the loading weight of the shelf.

Specifically, the customer's pick-up and put-back behaviors for the item are taken, so that the customer's images during the shopping process can be acquired. The shooting pickup camera can be arranged as follows: above the front of the three-dimensional space formed by the shelf, for example, the pickup camera is disposed on the top of the shopping place or on the shelf, and the shooting direction of the pickup camera can be downward. The identification of pick-up and put-back behaviors can be judged by the action behavior trajectory. If the customer has the item in his hand and gradually moves away from the shelf, the behavior is identified as the pick-up behavior for the item. If the customer has the item in his hand and gradually approaches the shelf, the behavior is identified as the put-back behavior for the item. The item identification can be done by identifying models, such as convolutional neural network models. The input of the model can be the collected item images, and the output can be the pick-up and put-back item (or called the kind of items in the item image), that is, the item corresponding to the customer's pick-up and put-back action. Since the shelf position is determined based on the gravity sensor that detects the loading weight changes, and the weight change is bound to be caused by the customer's execution of the pick-up and put-back behaviors, so that the pick-up and put-back time involved in this vision identification technology needs to match the time when the loading weight of the shelf changes, that is to say, only the pick-up and put-back time corresponding to the vision identification result which matches the time when the loading weight of the shelf changes is used as the item identification result. The vision identification result may include the kind of the pick-up and put-back items, and may also include the kind and the quantity of pick-up and put-back items.

The pick-up and put-back time is the execution time of the pick-up and put-back behavior, which can be any time when the image containing item is collected. It also can be, if the pick-up and put-back behavior is the pick-up behavior, the time when the image containing item is first collected in this pick-up and put back behavior as the pick-up and put-back time (or called the pick-up item time); if the pick-up and put-back behavior is the put-back behavior, the time when the image containing item is last collected in this pick-up and put back behavior as the pick-up and put-back time (or called the put-back item time).

Through this technology, the items for sale in the shopping place can be placed at will, that is, they can have no fixed locations. At the same time, the weight of each item can be the same, not limited to the different weight, thus the kinds of items are rich, which can better meet the personalized needs of customers. When the item is identified, the image processing is involved, thus it can be called the vision-based technology. Compared with the gravity sensing technology, this technology cannot limit the placement of items. For example, the items that customers do not intend to buy can no longer only be put back to an original position (or called an initial position), but can be placed on other shelf or other item shelf.

Step 205, the vision identification result is the item identification result.

It should be noted that the description contents of steps 204 and 205 are also the implementation method of step—identifying the items that cause changes in the loading weight of the shelf to obtain the item identification result.

Figure 3:
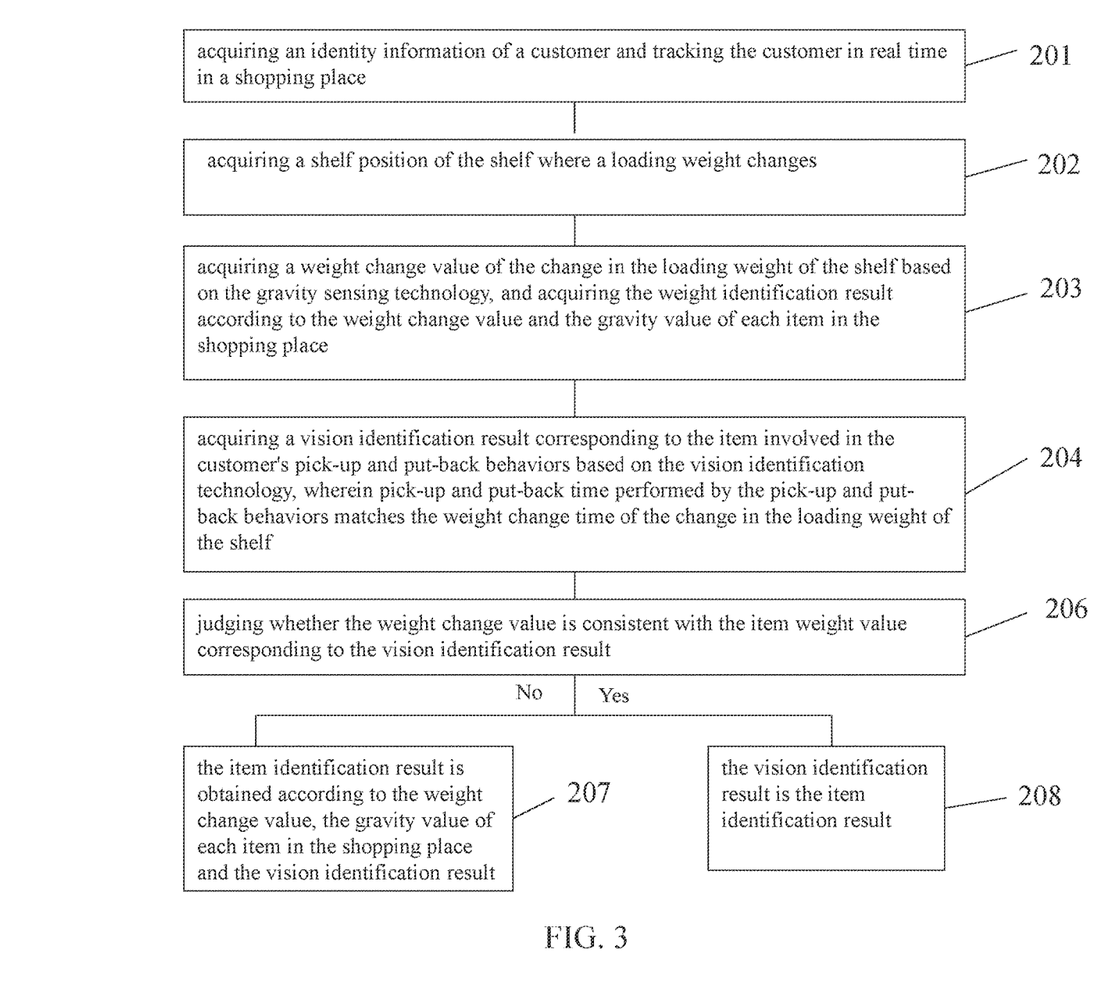
FIG. 3 is a schematic flowchart of another item-customer matching method based on vision and gravity sensing provided in another example of the present invention.

In some scenes, for example, if multiple items are taken at one time, mutual occlusion may occur between the multiple items, which will affect the accuracy of the vision identification result. At this time, the pick-up and put-back item of the vision identification result is not the item actually taken by the customer, for example, the identified pick-up and put-back item is D, while the item actually taken by the customer is C, that is, the actual item C is identified as item D. if item D is used as the item identification result, it will affect the customer's experience of unmanned shopping when settling accounts for customers. Therefore, in order to improve the customer's shopping experience and the accuracy of item identification, with reference to FIG. 3, after Step 204 and before Step 205, the matching method also includes:

Step 206, judging whether the weight change value is consistent with the item weight value corresponding to the vision identification result.

The item weight value corresponding to the vision identification result can be obtained in the total gravity table. Then it is compared with the weight change value.

Step 207, if the result of the judgment is inconsistent, then the item identification result is obtained according to the weight change value, the gravity value of each item in the shopping place and the vision identification result.

Specifically, the implementation method of this step can be as follows.

If there is only one weight identification result obtained according to the weight change value and the gravity value of each item in the shopping place, the weight identification result is taken as the item identification result. If the weight change value is G, the absolute value of G is used as the limiting condition to combine the items in the shopping place, and the total weight after combination is made consistent with G, and only one combination situation is obtained, so that the items constituting the combination are called weight prediction items, which are used as the actual items in the item identification result. That is to say, the weight identification result serves as the item identification result. Usually in this scenes, the vision identification result will also be consistent with the weight identification result. Therefore, the item identification result can also be the vision identification result.

The implementation method of this step can also be as follows.

If the multiple weight identification results are obtained according to the weight change value and the gravity value of each item in the shopping place, the weight identification result with the highest degree of coincidence with the vision identification result among the multiple weight identification results is used as the item identification result. The degree of coincidence refers to that the same kind of items exists between the weight identification result and the vision identification result, that is, the both has an intersection. In other words, the weight identification result that is the closest to the vision identification result is used as the item identification result.

The implementation method of this step can also be as follows.

If the items in the vision identification result belong to multi-specification items, the multi-specification items are items with the same appearance and different weights, such as different specifications of Coke, the kind of item is determined according to the vision identification result, the item specification corresponding to the vision identification result is determined according to the determined kind of items and the gravity value of each item in the shopping place, the quantity of items are determined according to the weight change value and the gravity value of the item, at this time the item identification result includes item specification and kind of items and the quantity of items, so that the selection of items in the shopping place can be diversified, and it can improve the goodness of the customer experience.

Step 208, if the result of the judgment is consistent, skipping to step 205.

In this step, if both the weight identification result and the vision identification result are acquired, and the corresponding weight change value and the weight value are consistent, the vision identification result is considered correct, thereby skipping to step 205, i.e., executing step 205.

It should be noted that the relevant description contents of Steps 204-208 are also the implementation method of step—identifying the items that cause changes in the loading weight of the shelf to obtain the item identification result.

In summary, in the examples of the present invention, the shelf position of the shelf where the loading weight changes is acquired by tracking the customers in real time in a shopping place; the items that cause changes in the loading weight of the shelf are identified to obtain the item identification result; the identity information of the purchaser is determined according to the shelf position, the customer's hand position and the customer's action behavior, wherein the purchaser is the customer matching the item identification result, thereby the accurate matching between the item identification result and the customer is realized, which is beneficial to the completion of the settlement work of the unmanned convenience store, and can also improve the accuracy of the item identification, and reduces the work of the cashier.

Figure 4:
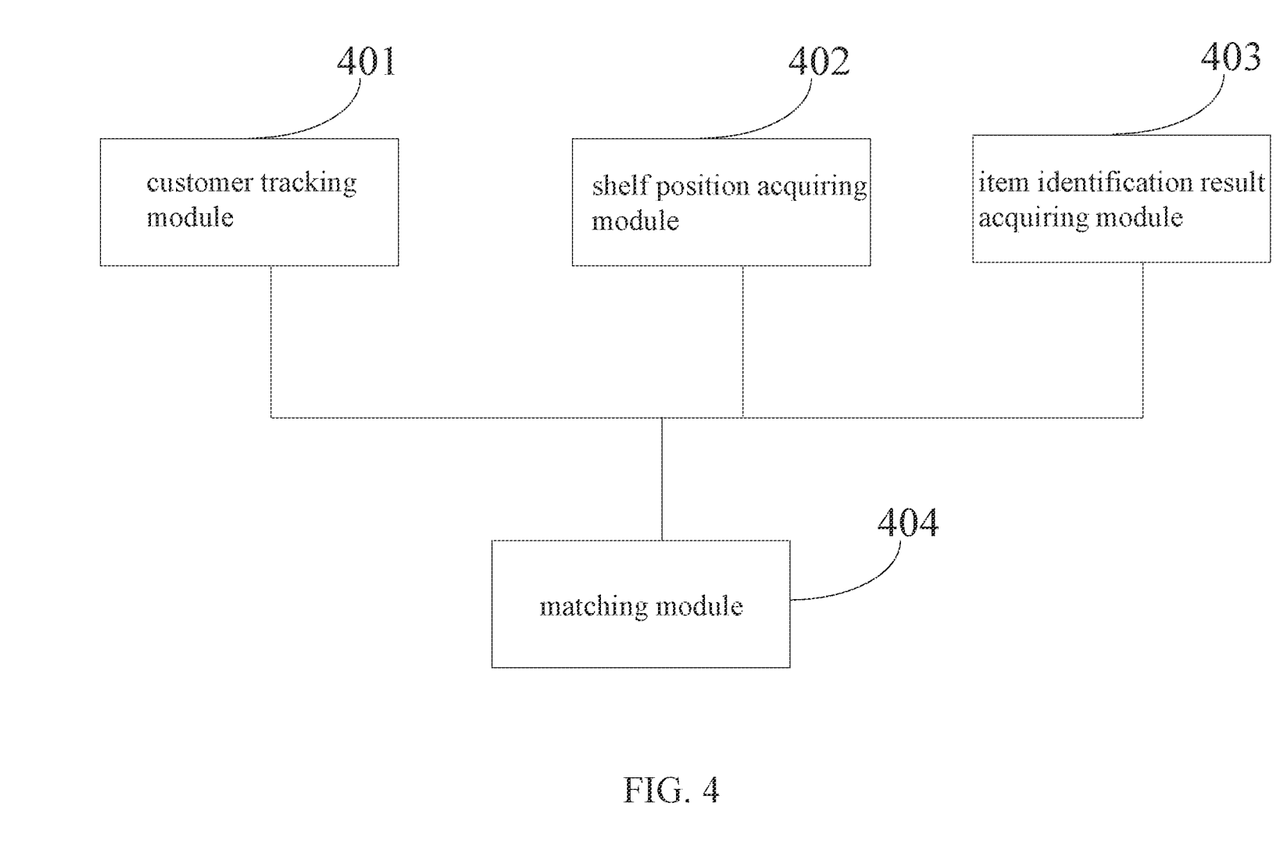
FIG. 4 is a structural schematic diagram of an item-customer matching device based on vision and gravity sensing provided in an example of the present invention.

With reference to FIG. 4, one example of the present invention provides an item-customer matching device based on vision and gravity sensing, which has the function of implementing the above-mentioned method examples. The function may be implemented by hardware, or may be implemented by the corresponding software executed by the hardware. The matching device includes: a customer tracking module 401, a shelf position acquiring module 402, an item identification result acquiring module 403, and a matching module 404.

Among them, the customer tracking module is used to acquire the identity information of a customer and track the customer in real time in the shopping place, wherein shelves for carrying items are arranged. The shelf position acquiring module is used to acquire the shelf position of the shelf where a loading weight changes. The item identification result acquiring module is used to identify the items that cause changes in the loading weight of the shelf to obtain the item identification result. The matching module is used to determine the identity information of the purchaser, according to the shelf position, the hand position of the customer and the action behavior of the customer, and the purchaser is the customer matching the item identification result.

Alternatively, the matching module includes a customer near the shelf determination unit and a matching unit. The customer near the shelf determination unit is used to determine the customer near the shelf according to the shelf position and a location of customer positioning, wherein the customer near the shelf is a customer located around the shelf when the loading weight changes. The matching unit is used to determine the purchaser according to the hand position and the action behavior of the customer near the shelf, wherein the purchaser's action behavior causes changes in the loading weight of the shelf.

Alternatively, the item identification result module includes a weight change value acquiring unit and a first item identification result acquiring unit. The weight change value acquiring unit is used to acquire a weight change value of the change in the loading weight of the shelf based on the gravity sensing technology. The first item identification result acquiring unit is used to acquire the weight identification result according to the weight change value and the gravity value of each item carried by the shelf, and the weight identification result is the item identification result.

Alternatively, the item identification result module includes a vision identification result acquiring unit and a second item identification result acquiring unit. The vision identification result acquiring unit is used to acquire a vision identification result corresponding to the item involved in the customer's pick-up and put-back behaviors based on the vision identification technology, wherein the pick-up and put-back time performed by the pick-up and put-back behavior matches the weight change time of the change in the loading weight of the shelf. The second item identification result acquiring unit is used to make the vision identification result be the item identification result.

Alternatively, the item identification result module also includes a judgment unit, a third item identification result acquiring unit and a skipping unit. The judgment unit is used to judge whether the weight change value is consistent with a pick-up and put-back gravity value, wherein the pick-up and put-back gravity value is a gravity value of the pick-up and put-back item corresponding to the pick-up and put-back time. The third item identification result acquiring unit is used to obtain the item identification result according to the weight change value, the gravity value of each item in the shopping place and the vision identification result, if the result of the judgment is inconsistent. The skipping unit is used to execute the function of the second item identification result acquiring unit, if the result of the judgment is consistent.

In summary, the examples of the present invention set the customer tracking module, the shelf position acquiring module, the item identification result acquiring module and the matching module to realize the accurate matching between the item identification result and the customer, which is beneficial to the completion of the settlement work of the unmanned convenience store, and can also improve the accuracy of the item identification, and reduces the work of the cashier.

One example of the present invention provides an item-customer matching device based on vision and gravity sensing, which includes a memory and a processor.

The processor is connected with the memory, and is configured to execute the above-mentioned item-customer matching method based on vision and gravity sensing based on the instructions stored in the memory.

One example of the present invention provides a computer-readable storage medium in which at least one instruction, at least one program, code set, or instructions set are stored, and at least one instruction, at least one program, code set, or instructions are loaded by the processor and execute to implement the above-mentioned item-customer matching method based on vision and gravity sensing. The computer storage medium may be read-only memory (ROM), random memory (RAM), CD-ROM, magnetic tape, floppy disk, and optical data storage device.

The examples described herein may be implemented by hardware, software, firmware, middleware, microcode, or any combination thereof. For hardware implementation method, the aforementioned terminal device can be realized by designing one or more application specific integrated circuits (ASIC), digital signal processor (DSP), digital signal processor device (DSPD), programmable logic device (PLD), field programmable gate arrays (FPGA), controller, microcontroller, micro processor or other electronic elements to execute the modules or combination thereof of the functions described herein. When the examples are implemented by software, firmware, middleware or microcode, program code or code segments, they may be stored in a machine-readable medium such as a storage component.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. A matching method for an item-customer matching device based on vision and gravity sensing comprising:
   acquiring identity information as an identifier of a customer through an identity information identification device and tracking the customer in real time in a shopping place by adopting a positioning method of a depth pickup camera to obtain the location of the customer, and acquiring a hand position of the customer based on the depth pickup camera technology, shelves for carrying items are arranged in the shopping place, and the shelves are provided with the shelf gravity value table, wherein kinds of all items placed on the shelves and corresponding weight values are recorded;
   acquiring a shelf position of the shelf where a loading weight changes when a gravity sensor set on the shelf detects a change in the loading weight; and
   identifying the items that cause changes in the loading weight of the shelf to obtain an item identification result, which comprises:
   acquiring a weight change value of the change in the loading weight of the shelf based on the gravity sensing technology;
   acquiring a vision identification result corresponding to the picked-up and put-back items involved in the customer's pick-up and put-back behaviors by shooting images with the customer's pick-up and put-back behaviors, the hand position of the customer, identifying the customer's pick-up and put-back behaviors that cause changes in the loading weight of the shelf and the picked-up and put-back items involved in the customer's pick-up and put-back behaviors based on the vision identification technology, wherein pick-up and put-back time performed by the pick-up and put-back behavior matches the weight change time of the change in the loading weight of the shelf, the vision identification result includes kinds and quantities of the picked-up and put-back items;
   judging whether the weight change value is consistent with a pick-up and put-back gravity value, wherein the pick-up and put-back gravity value is a gravity value computed according to the kinds and quantities of the picked-up and put-back items involved in the pick-up and put back behaviors performed in the pick-up and put-back time corresponding to the vision identification result and the kinds and corresponding weight values of all items recorded in the shelf gravity value table;
   if not, combining the kinds and corresponding weight values of all items recorded in the shelf gravity value table in the shopping place according to the weight change value, and taking item combinations in which the combined total weight is consistent with the absolute value of the weight change value as weight identification results, taking a weight identification result among the weight identification results whose kinds of items consisting of the item combinations have the highest degree of coincidence with the kinds of items included in the vision identification result as an item identification result, the item combination corresponding to the weight identification result with the highest degree of coincidence includes the kinds and quantities of the picked-up and put-back items;

if yes, skipping to a step that the vision identification result is the item identification result; and determining the customers located around the shelf when the loading weight changes according to the shelf position and the location of the customer obtained by tracking in real time as customers near the shelf, then determining the customer who causes changes in the loading weight of the shelf in the pick-up and put-back time among the customers near the shelf according to the hand position and the pick-up and put-back behaviors of the customers near the shelf, determining the customer who causes changes in the loading weight of the shelf as the purchaser matching with the item in the item identification result according to the identifier of the customer obtained by tracking in real time in the shopping place.

2. An item-customer matching device based on vision and gravity sensing comprising:

a customer tracking device for acquiring identity information as an identifier of a customer through an identity information identification device and tracking the customer in real time in a shopping place by adopting a positioning method of a depth pickup camera to obtain the location of the customer, and acquiring a hand position of the customer based on the depth pickup camera technology, shelves for carrying items are arranged in the shopping place, and the shelves are provided with the shelf gravity value table, wherein kinds of all items placed on the shelves and corresponding weight values are recorded;

a shelf position acquiring device for acquiring a shelf position of the shelf where a loading weight changes when a gravity sensor set on the shelf detects a change in the loading weight; and an item identification result acquiring device for identifying the items that cause changes in the loading weight of the shelf to obtain an item identification result;

the matching device is characterized in that, the item identification result acquiring device comprises:

a weight change value acquiring device for acquiring a weight change value of the change in the loading weight of the shelf based on the gravity sensing technology;

a vision identification result acquiring device for acquiring a vision identification result corresponding to the picked-up and put-back items involved in the customer's pick-up and put-back behaviors by shooting images with the customer's pick-up and put-back behaviors, the hand position of the customer, identifying the customer's pick-up and put-back behaviors that cause changes in the loading weight of the shelf and the picked-up and put-back items involved in the customer's pick-up and put-back behaviors based on the vision identification technology, wherein pick-up and put-back time performed by the pick-up and put-back behavior matches a weight change time of the change in the loading weight of the shelf, the vision identification result includes kinds and quantities of the picked-up and put-back items;

a second item identification result acquiring device for making the vision identification result be the item identification result;

a judgment device for judging whether a weight change value is consistent with a pick-up and put-back gravity value, wherein the pick-up and put-back gravity value is a gravity value computed according to the kinds and quantities of the picked-up and put-back items involved in the pick-up and put back behaviors performed in the pick-up and put-back time corresponding to the vision identification result and the kinds and corresponding weight values of all items recorded in the shelf gravity value table;

a third item identification result acquiring device for, if the result of the judgment is inconsistent, combining weight values of all items recorded in the shelf gravity value table in the shopping place according to the weight change value, and taking item combinations in which the combined total weight and the absolute value of the weight change value are consistent as weight identification results, taking a weight identification result among the weight identification results whose kinds of items consisting of the item combinations have the highest degree of coincidence with the kinds of items included in the vision identification result as an item identification result, the item combination corresponding to the weight identification result with the highest degree of coincidence includes the kinds and quantities of the picked-up and put-back items; and a skipping device for performing the function of the second item identification result acquiring device, if the result of the judgment is consistent; and a matching device including a customer-near-shelf determining unit and a matching unit; wherein the customer-near-shelf determining unit is used for determining the customer located around the shelf when the loading weight changes according to the shelf position and the location of the customer obtained by tracking in real time as the customer near the shelf;

the matching unit is used for determining the customer who causes changes in the loading weight of the shelf in the pick-up and put-back time among the customers near the shelf according to the hand position and the pick-up and put-back behaviors of the customer near the shelf, determining the customer who causes changes in the loading weight of the shelf as the purchaser matching with the item in the item identification result according to the identifier of the customer obtained by tracking in real time in the shopping place.

* * * * *